3,543,166
DUTY CYCLE MODULE
Charles M. Rabinowitz, Bloomfield, Conn., assignor to Chandler Evans Inc., West Hartford, Conn., a corporation of Delaware
Filed July 16, 1968, Ser. No. 745,190
Int. Cl. H03k 1/18
U.S. Cl. 328—58                                                11 Claims

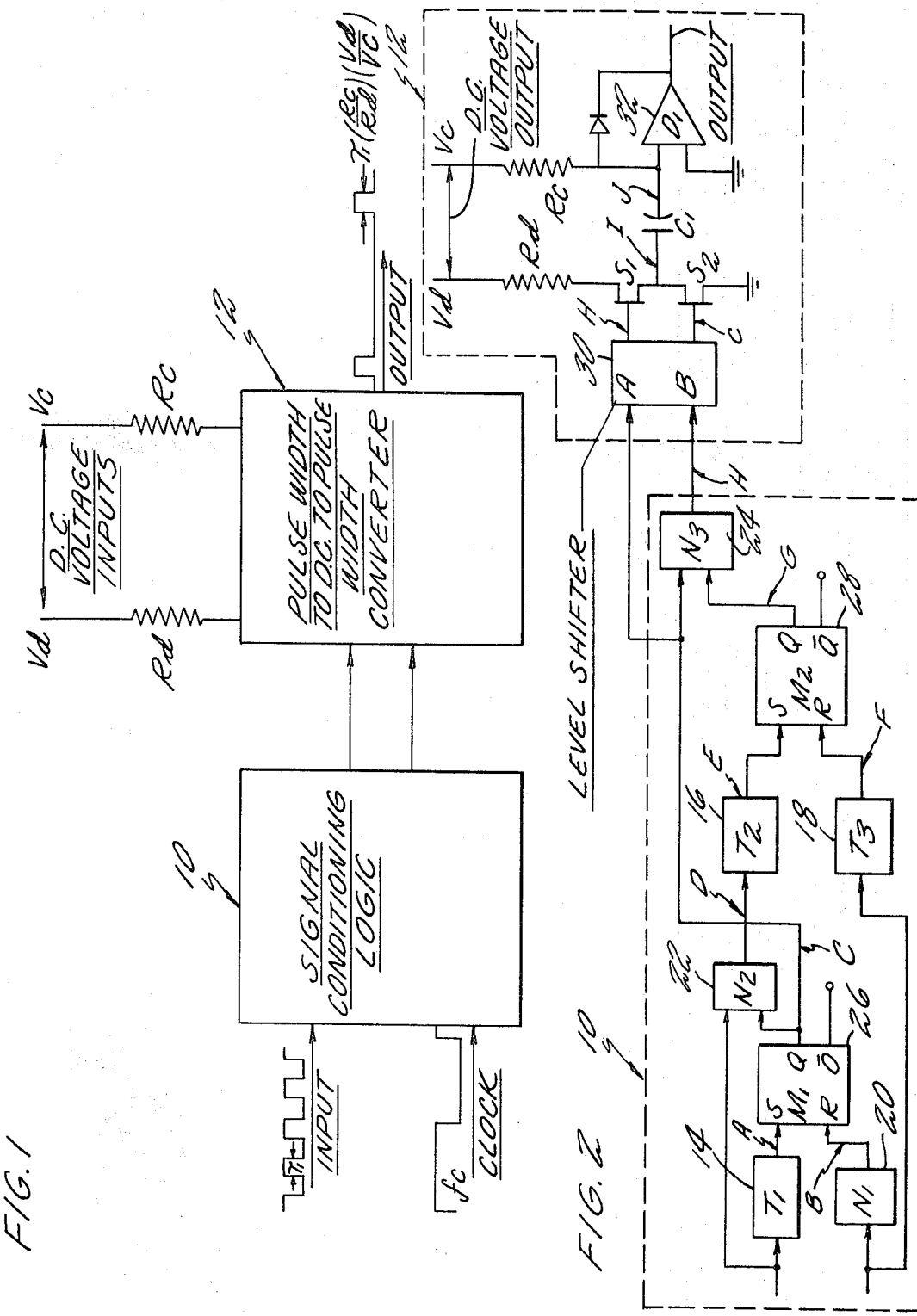

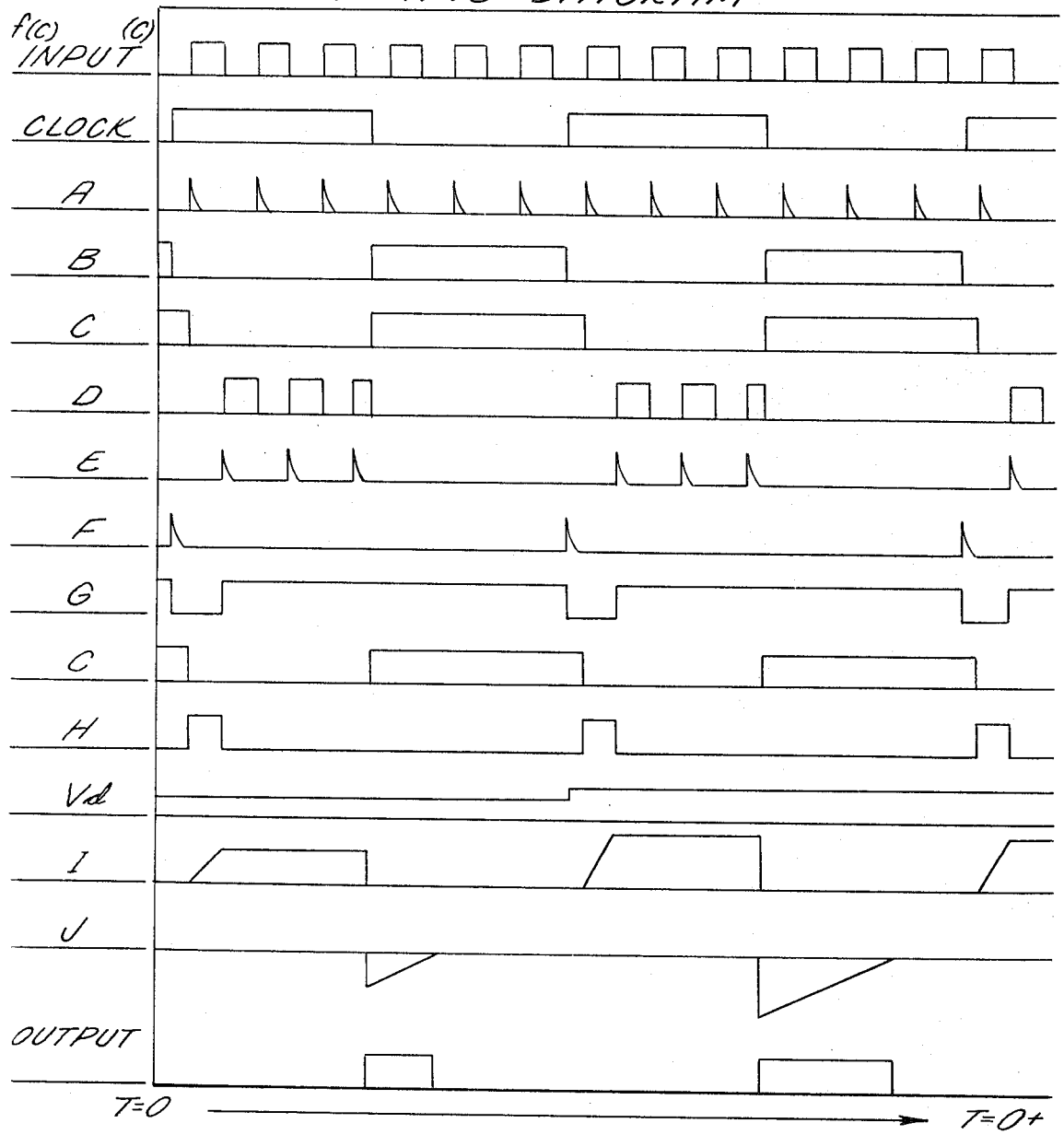

ABSTRACT OF THE DISCLOSURE

A duty cycle module employing NOR logic, the module receiving input pulse trains which are to be compared, the input signals being demodulated and stored in analog form. The stored information is thereafter read out in pulse form, the output pulses being synchronized with one of the input pulse trains, and the output pulses may be pulse width modulated by variable direct current input signals.

BACKGROUND OF THE INVENTION

Field of the invention

The present invention relates to duty cycle modules. More particularly, the present invention is directed to a hybrid buffer storage device for variable frequency or pulse width input signals, the input signals being demodulated and stored as analog signals and thereafter being read out as pulses having a width commensurate with the input signal information of interest and synchronized with a reference pulse train. Accordingly, the general objects of the present invention are to provide novel and improved apparatus of such character.

Description of the prior art

There are innumerable applications which require circuits having the ability to synchronize and/or compare input pulse trains commensurate with, for example, the speeds of two members. Such input pulse trains will be of differing frequency and/or pulse width. In the prior art, such signals could be compared only after conversion to either analog or digital form. The foregoing has been as a result of the fact that prior art pulse width comparison circuits designed for synchronizing or comparing pulsating input signals have lacked the capability for storing such signals for the period of time necessary to make the comparison or effect the delay necessary to provide synchronization.

As a direct result of this lack of storage capability, pulse width computation has previously had very limited utility. Accordingly, rather than operating on unsynchronized pulse train input signals at their lowest level, it has previously been necessary to first convert such signals to either analog or digital form and to thereafter carry out the desired arithmetic function on the signals as converted. As is well known, analog computations are in reality a signal conditioning procedure rather than a computation and are lacking in accuracy. Converting to digital signals and operating on the signals in digital form permits increased accuracy but, as is well known, is a comparatively expensive approach.

In addition to the prior art's lack of storage capability and the inability to form actual pulse width computation with unsynchronized signals, previous duty cycle modules have not been independent of power supply variations. For many applications, such output signal variations are intolerable. While one shot multivibrators have been used as time base generators in pulse width circuits, they have been subject to errors due to temperature and power supply variations.

SUMMARY OF THE INVENTION

The present invention comprises a novel and improved duty cycle module which overcomes the above-discussed and other disadvantages of the prior art. In achieving these improvements, the present invention accepts a pulsating reference or control signal and a second input having a different and usually variable frequency or pulse width. The second or variable input signal is demodulated and stored as an analog signal for a short period and thereafter read out as a signal having a pulse width commensurate with the information desired to be extracted from the variable input signal and synchronized with the reference signal. Thus, the present invention comprises first means responsive to information bearing input and reference signals for generating a signal synchronized with the leading edge of an information bearing input pulse and second means responsive to the information bearing input and reference pulses and also responsive to the signal synchronized with an input pulse lagging edge for providing an output signal which is synchronized with the lagging edge of the information bearing pulses. The signals synchronized with the leading and lagging edges of the information bearing input pulses are applied to circuitry which determines the input pulse width and provides an output pulse having a width which is equal to the input pulse width and which occurs during a reference pulse. This output pulse equal to the input pulse width is applied to a storage device wherein it may be modulated by a direct current voltage level. The stored signal, either modulated or unmodulated, will be read out of the module in response to the occurrence of the trailing edge of the reference signal. Accordingly, output signals having a pulse width commensurate with the width of information bearing input pulses and synchronized with a reference pulse train will be provided.

From the foregoing summary of the present invention, it may be seen that an object thereof is to provide an improved duty cycle module.

It is also an object of the present invention to provide circuitry which will function as a frequency to analog converter, such circuitry making use of a very accurate clock as a time base.

It is another object of the present invention to provide a duty cycle module which may be employed as an analog to pulse width converter.

It is a further object of the present invention to provide a duty cycle module which comprises a hybrid buffer storage device for pulse width or frequency inputs, the device demodulating and storing as an analog signal for short periods pulsating input signals, the stored signals being read out as a pulse width.

It is also an object of the present invention to provide circuitry which may function as a frequency synchronizer for a pair of different frequency input signals, one of the input signals having a frequency at least three times that of the other and there being no other relationship between the input signals.

It is yet another object of the present invention to provide a duty cycle module which may be employed as a pulse width stretcher or squeezer.

It is still another object of the present invention to provide a duty cycle module which is completely independent of power supply drift.

BRIEF DESCRIPTION OF THE DRAWING

The foregoing and other objects and advantages of the present invention will become apparent to those skilled in the art by reference to the accompanying drawing wherein like reference numerals refer to like elements in the various figures and in which:

FIG. 1 is a block diagram of the duty cycle module of the present invention.

FIG. 2 is a block diagram of a preferred embodiment of the present invention, FIG. 2 showing the invention in greater detail than FIG. 1 and having indicia thereon to indicate signals as might appear at various times at various points within the circuit.

FIG. 3 comprises a timing diagram showing various signals as might appear at various points in the duty cycle module of FIG. 1, the waveforms of FIG. 3 being indicated by the same indicia as applied to FIG. 2.

DESCRIPTION OF THE PREFERRED EMBODIMENT

Figure 4:
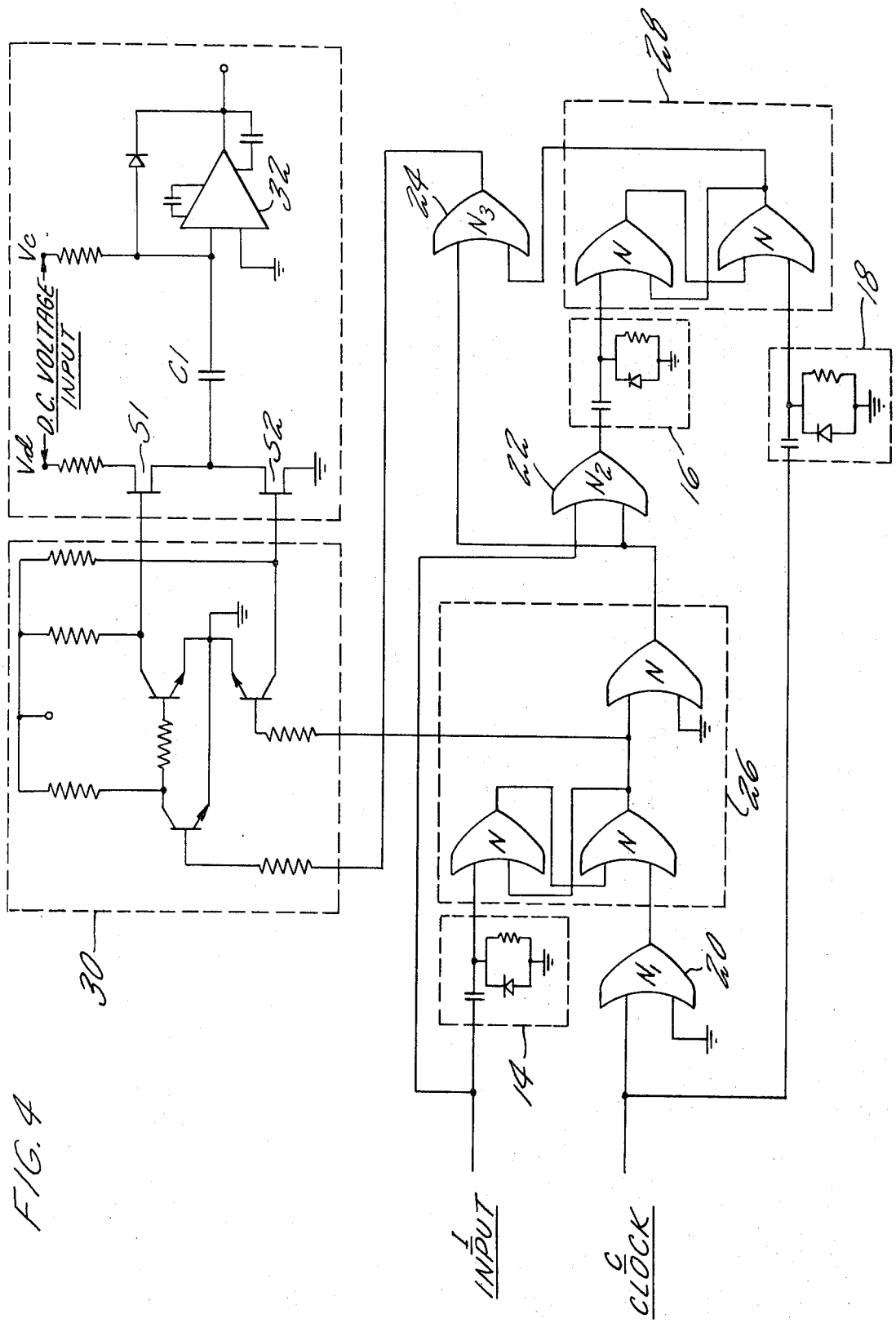
FIG. 4 is a schematic diagram of the preferred embodiment of the present invention shown in FIG. 2.

With reference now to FIG. 1, the principal sub-systems of the present invention are shown in block form. From FIG. 1, it may be seen that the duty cycle module comprises a signal conditioning logic system, indicated generally at 10, and a pulse width converter, indicated generally at 12. Logic unit 10 will accept input pulses of variable frequency and width and clock or reference pulses from a suitable source, for example a crystal controlled oscillator. For optimum operation, it has been found that the pulse repetition rate of the variable frequency input signals should be at least three times that provided by the clock pulse source. It should also be noted that, for some applications, it may be necessary to employ a signal conditioner such as a square wave generator for shaping the variable frequency input pulses. In response to variable frequency input pulses and clock pulses, logic system 10 reads out one input pulse for each cycle of the clock signal.

The "input" pulses read out from the logic unit 10 are applied to converter unit 12. Also applied to converter unit 12 are a pair of DC voltage inputs $V_c$ and $V_d$. In a manner to be described in greater detail below, converter unit 12 accepts the logic unit output pulses and the DC voltage inputs and provides therefrom logic unit output pulses which are synchronized with the clock pulse source and which have a pulse width commensurate with the width of the variable frequency input pulses multiplied by a factor determined by the pair of DC input voltage levels and a pair of series connected resistors $R_d$ and $R_c$. Thus, the present invention may provide, from an input pulse signal having a pulse width of $\tau_{in}$, an output pulse train which is synchronized with a clock or other frequency standard and which has a pulse width in accordance with the following equation:

(1) $$\tau_{out} = \tau_{in} \left(\frac{R_c}{R_d}\right)\left(\frac{V_d}{V_c}\right)$$

Thus, while as indicated above not limited thereto in its utility, it may be seen from Equation 1 that the present invention may be employed as a voltage to pulse width converter.

Turning now to FIG. 2, the duty cycle module of FIG. 1 is shown, still in block form, in greater detail. As may be seen from FIG. 2, the logic unit 10 comprises memory trigger circuits 14, 16 and 18; NOR logic gates 20, 22 and 24; and one bit memory circuits 26 and 28.

The converter unit 12 usually, but not necessarily, includes a voltage level shifter 30, a differential comparator including amplifier 32 and a pair of solid state switches S1 and S2.

Operation of the circuit of FIG. 2 may best be understood from joint consideration of FIGS. 2 and 3. For ease in understanding of the invention, the various waveforms of FIG. 3 have been indicated by reference letters and the same indicia has been applied to FIG. 2 at the points where the various waveforms appear in the circuit.

The input pulse train is applied to memory trigger circuit 14 and to NOR gate 22. The clock pulses are applied to NOR gate 20 and simultaneously to trigger circuit 18. As indicated by waveform A, trigger circuit 14 provides a series of positive going spikes, each such spike being commensurate with the leading edge of each input pulse. Accordingly, trigger 14 retains positive going signals, one such signal being provided for each input pulse. NOR gate 20, as indicated by waveform B, inverts the incoming clock pulses.

Both the inverted clock pulses and the positive going spikes from trigger circuit 14 are applied to single bit memory circuit 26. The single bit memory circuits 26 and 28 preferably comprise standard, state-of-the-art NOR gates connected to form an R–S (set-reset) flip-flop NOR cuit. As may be seen from waveform C, the next input pulse which is received after the lagging edge of an inverted clock pulse will trigger memory circuit 26 into the zero state. Thereafter, the leading edge of the inverted clock pulse signal B triggers the memory circuit back to the one state. Memory circuit 26 will provide a clock or control signal, signal C, for the converter circuit 12. The leading edge of each control signal C pulse is synchronized with the lagging edge of a clock pulse while the lagging edge of signal C is synchronized with the leading edge of the accepted input pulse.

The control pulses C generated by memory circuit 26 are also applied to NOR gate 22. In addition, as previously noted, the input pulse train is also applied to NOR gate 22. Gate 22 is a conventional NOR circuit which sums up the input pulses and the control pulses C to provide output waveform D. It is to be noted that the output of NOR gate 22 comprises a series of spaced groups of pulses, the pulses in each group being commensurate with the input pulses received during intervals when the memory circuit 26 is in the zero state.

The output signal D from NOR gate 22 is applied to a second memory trigger circuit 16. Memory trigger circuit 16 provides a positive going spike corresponding to the leading edge of each complete or partial input pulses (waveform D) passed by NOR gate 22. The positive going spikes retained by memory trigger circuit 16, as indicated by waveform E, will be applied as one input signal to memory circuit 28.

As previously noted, the input clock pulses are applied to both NOR gate 20 and also to memory trigger circuit 18. Circuit 18 will typically be identical to trigger circuits 14 and 16 and, accordingly, the output of trigger circuit 18 will be a series of positive spikes, each spike being commensurate with the leading edge of a clock pulse as shown by waveform F. As in the case of the output of trigger circuit 16, the positive spikes provided by trigger circuit 18 are applied as an input to memory circuit 28. Memory circuit 28 will typically be a single bit memory which functions in the same manner as memory circuit 26. In response to the applied waveforms E and F, memory circuit 28 will provide output pulses as indicated by waveform G. As may be seen, the lagging edge of the pulses comprising waveform G will be synchronized with leading edges of the clock pulses. The leading edges of the output pulses from memory circuit 28 will be synchronized with the lagging edge of the accepted input pulses.

The output waveforms C and G, respectively from memory circuits 26 and 28, are applied to NOR gate 24 which sums these signals to provide an output waveform as indicated at H on FIG. 3. As will now be obvious to those skilled in the art, NOR gate 24 generates one pulse having a width identical to the width of the input pulses applied to trigger circuit 14 during the period of each clock pulse applied to NOR gate 20. Restated, NOR gate 24 sums the outputs of memory circuits 26 and 28 to provide pulses having a width equal to the input pulse width (from the source which is not controlled) and the repetition rate of this pulse is equal to the frequency of the incoming clock pulses. However, the output of NOR gate 24 is not phase aligned with the clock pulses.

The output waveform H of NOR gate 24 and the waveform C provided by memory circuit 26 are applied to converter unit 12. While not necessary, it is usually desirable to enhance the magnitude of the two inputs to the converter unit and thus a level shifter 30 will typically be employed at the input to converter 12. The amplified waveforms C and H from level shifter 30 are respectively applied to solid state switches S1 and S2. It has been found desirable to employ field-effect transistors for switches S1 and S2 since these devices ideally have zero offset voltage and low on resistances (i.e., switches S1 and S2 look like pure resistances). Waveform C has been reproduced on FIG. 3 directly above waveform H to show the signals which control the switching of switches S1 and S2. Adjustable DC voltage $Vd$ is applied via resistor $Rd$ to switch S1 and via switch S1 to switch S2. The switching of switches S1 and S2 respectively by the output signals generated by memory unit 26 and NOR gate 24 results in waveform I appearing at the input side of capacitor C. Thus, the charging of the capacitor to a voltage level determined by direct current input $Vd$ is initiated by the leading edge of an accepted input pulse (with which the leading edge of waveform H is synchronized) and the capacitor will charge up to a level determined by DC input $Vd$ and the width or duration of the accepted input pulse (which is equal to the width of the pulses comprising waveform H). The charge is held on capacitor C1 until switch S2 is closed by the leading edge of waveform C at which time the capacitor is discharged to ground through switch S2.

The waveform J which appears at the other side of capacitor C1 as a result of discharge of the capacitor through switch S2 is applied as an input to a differential comparator 32. The magnitude and thus also the duration of sawtooth pulses J is a direct function of the magnitude of waveform I and thus commensurate with input pulse width. At the input to the comparator, the voltage (waveform J) coupled from the solid state switches S1 and S2 is added to a DC voltage level determined by input $Vc$. It should be noted that the magnitude of the input pulses to differential comparator 32 is increased, in a negative direction, as the voltage level $Vd$ is increased or as $Rd$ is decreased or as the width of pulses H are increased. It should also be noted that the effect of capacitor C1 on the circuit is negligible because the output of the comparator is:

$$\tau_{out} = \tau_{in} \frac{Rc}{Rd} \frac{Vd}{Vc} \frac{C1}{C1}$$

and thus the capacitance is cancelled out. For best operation, the period of operation of switches S1 and S2 has been found to be less than 10% of the time constant of the RC circuit determined by $Rd$ and C1, this mode of operation being in the interest of linearity and stability. It should also be noted that if $Vc$ and $Vd$ are supplied from the same source, the circuit will be completely independent of power supply variations and the output pulse width thus directly proportional to a reference signal, which may come from a highly accurate digital clock, and the ratio of $Rc$ and $Rd$, which may be precision resistors.

As may be seen from the output waveform indicated on FIG. 3, differential comparator 32 provides output pulses which are locked on to the lagging edge of the input clock pulses. Thus, the present invention provides output signals which are related to the variable or information bearing input signals but which are delayed a period not greater than one-half and not less than one-third of the period of the reference or clock input signal cycle. The magnitude of these output pulses is fixed and constant. However, as may be seen from FIG. 3, the width of the output pulses is equal to the input pulse width plus a factor determined by the DC voltage inputs $Vd$ and $Vc$. Thus, by comparing the output waveform on FIG. 3 with $Vd$, it may be seen that the output pulse width, for input pulses of constant pulse width, increases when $Vd$ is increased. Also, by comparing waveform J with the output signal, it may be seen that the differential comparator 32 provides an output pulse of constant magnitude and of duration determined by the discharge time of capacitor C1.

Referring now to FIG. 4, the circuitry of a preferred embodiment of the present invention is shown in greater detail. From FIG. 4, it may be seen that trigger circuits 14, 16 and 18 comprise standard differentiator circuits. NOR gates 20, 22 and 24 preferably comprise commercially available logic circuits which would be obtained in the form of integrated circuit packages. Memory circuits 26 and 28 are shown as comprising standard NOR logic circuits, preferably in integrated circuit form, which are interconnected to form RS flip-flops. Alternatively, available RS flip-flop circuits can be employed. As previously noted memory circuits 26 and 28 function as one bit memories. It is to be noted that memory circuit 26 employs a third NOR gate, the use of this additional logic circuit being in the interest of filtering. Level shifter 30 can also be a commercially available circuit. While shown as comprised of discrete components, a dual input NOR interface gate in integrated circuit form has been employed for level shifter 30.

While a preferred embodiment has been shown and described, various modifications and substitutions may be made thereto without departing from the spirit and scope of the present invention. For example, while NOR logic has been described, it would be within the capabilities of one skilled in the art to perform the same functions employing NAN logic. Accordingly, it is to be understood that the present invention has been described by way of illustration and not limitation.

What is claimed is:
1. A duty cycle module comprising:
   first means responsive to an information bearing input pulse train and to a reference input pulse train for providing a signal commensurate with the leading edge of a selected information bearing input pulse received during the period of a reference pulse;
   second means responsive to the information bearing input pulse train and to the signal commensurate with selected input pulse leading edge provided by said first means, said second means generating a signal commensurate with the trailing edge of the selected input pulse;
   third means responsive to the reference pulse train and to said signal commensurate with the trailing edge of the selected input pulse generated by said second means, said third means providing an output pulse synchronized with the leading edge of a reference pulse;
   fourth means responsive to said signal synchronized with the leading edge of a reference pulse provided by said third means and to said signal commensurate with the leading edge of the selected input pulse provided by said first means, said fourth means generating a pulse having a width commensurate with that of the selected input pulse; and
   switch means responsive to said signal commensurate with selected input pulse leading edge provided by said first means and to the pulse generated by said fourth means, said switch means providing an output pulse having a width commensurate with the width of the selected input pulse, said output pulse occurring during the period of a reference pulse.

2. The apparatus of claim 1 wherein said switch means includes:
means for modulating the output pulse.

3. The apparatus of claim 1 wherein said first means comprises:
a first single bit memory device.

4. The apparatus of claim 1 wherein said third means comprises:
a single bit memory device.

5. The apparatus of claim 3 wherein said third means comprises:
a second single bit memory device.

6. The apparatus of claim 5 wherein said switch means includes:
means for pulse width modulating the output pulse.

7. The apparatus of claim 5 wherein said fourth means comprises:
means connected to said first and second memory devices for summing the output pulses provided thereby.

8. The apparatus of claim 7 wherein said second means comprises:
means for summing information bearing input pulses and the signals commensurate with the leading edge of a selected information bearing input pulse provided by said first memory device.

9. The apparatus of claim 1 wherein said switch means comprises:
a pair of switching devices, one of said switching devices being responsive to the signal provided by said first means and the other of said switching devices being responsive to the signal generated by said fourth means;
a pulse shaping circuit; and
capacitive circuit means for coupling pulses from said switching devices to said pulse shaping means.

10. The apparatus of claim 8 wherein said switch means comprises:
first switch means, said first switch means being closed in response to said signals commensurate with selected input pulse width generated by said fourth means;
second switch means, said second switch means being closed in response to said signals commensurate with the leading edge of the selected input pulse as provided by said first memory device;
a pulse shaping circuit; and
capacitive circuit means for coupling pulses from said switching devices to said pulse shaping means, said capacitive circuit being charged in response to the closing of said first switch means and being discharged in response to the closing of said second switch means.

11. The apparatus of claim 10 wherein said switch means further comprises:
means for pulse width modulating the signals coupled by said capacitive circuit means to said pulse shaping means.

References Cited

UNITED STATES PATENTS

| 3,390,354 | 6/1968 | Munch | 332—9 |
| 3,441,877 | 4/1969 | Thompson | 307—265 XR |
| 3,456,150 | 7/1969 | Attwood | 307—265 XR |
| 3,465,174 | 9/1969 | Soltz | 307—265 XR |

STANLEY T. KRAWCZEWICZ, Primary Examiner

U.S. Cl. X.R.

307—238, 251, 265, 269; 328—63; 332—9